United States Patent
Simon

[11] Patent Number: 6,062,791
[45] Date of Patent: May 16, 2000

[54] SCREW UNIT WITH TRANSVERSELY ADJUSTABLE SUPPORT SLEEVE

[76] Inventor: Werner Simon, Erwinstrasse 2, 42289 Wuppertal, Germany

[21] Appl. No.: 09/242,149
[22] PCT Filed: Jun. 2, 1998
[86] PCT No.: PCT/EP98/03273
  § 371 Date: Feb. 9, 1999
  § 102(e) Date: Feb. 9, 1999
[87] PCT Pub. No.: WO98/58180
  PCT Pub. Date: Dec. 23, 1998

[30] Foreign Application Priority Data

Jun. 18, 1997 [EP] European Pat. Off. .............. 97109907

[51] Int. Cl.[7] .............................. F16B 43/00; F16B 43/02
[52] U.S. Cl. ........................... 411/535; 411/432; 411/546
[58] Field of Search ........................... 411/111, 112, 113, 411/432, 535, 536, 546

[56] References Cited

U.S. PATENT DOCUMENTS

| | | | |
|---|---|---|---|
| 4,453,346 | 6/1984 | Powell et al. | 411/535 X |
| 4,529,244 | 7/1985 | Zaydel . | |
| 5,340,258 | 8/1994 | Simon | 411/535 |
| 5,492,388 | 2/1996 | Kawasaki | 411/535 X |

FOREIGN PATENT DOCUMENTS

| | | |
|---|---|---|
| 0543046 | 5/1993 | European Pat. Off. . |
| 3304569 | 7/1984 | Germany . |
| 4412431 | 10/1995 | Germany . |

*Primary Examiner*—Neill Wilson
*Attorney, Agent, or Firm*—Friedrich Kueffner

[57] ABSTRACT

The screw unit for the adjustable and lockable spanning of distances between structural components, brackets, and for adjusting assemblies, etc., consists of a threaded pin, which has adjusting surfaces and a central bore passing through it, and a nut, which is screwed onto the threaded pin. This nut is designed as a support sleeve with an internal thread and adjusting surfaces, into which the threaded pin can be screwed until it is more or less flush. On the end facing an adjusting collar, the support sleeve is provided with an inward-projecting, ring-shaped collar with the internal thread, whereas the free end of the threaded pin is provided with a stop element to prevent the pin from being completely unscrewed.

So that the unit can be adjusted not only in the height direction but also in the direction perpendicular to that, the support sleeve is attached to a sliding support element so that it can be shifted in the direction perpendicular to the longitudinal axis of the screw unit, the support element itself being held in place on a spacer.

9 Claims, 3 Drawing Sheets

SCREW UNIT WITH TRANSVERSELY ADJUSTABLE SUPPORT SLEEVE

BACKGROUND OF THE INVENTION

1. Field of the Invention

The invention pertains to a screw unit for the adjustable and lockable spanning of distances between structural components, brackets, and for the adjustment of assemblies, etc.

2. Description of the Related Art

A screw unit described in EP 0,543,046 B1 consists of a threaded pin with adjusting surfaces and a central bore; a nut, which is designed as a support sleeve with an internal thread, is screwed onto the pin. Certain areas of the sleeve are provided with adjusting surfaces. The threaded pin can be screwed into the nut until it is more or less flush. The end of the support sleeve facing an adjusting collar on the threaded pin is provided with an inward-projecting, ring-shaped collar with the internal thread. A stop element is provided on the free end of the threaded pin to prevent it from being completely unscrewed. A screw unit such as this can be used both to keep a certain distance between two structural components and to level them; it can also be adjusted and re-adjusted over a considerable distance without the danger of the threaded pin being screwed all the way out of the support sleeve. The threads also overlap sufficiently to ensure that the support forces can be reliably absorbed. To connect the components, brackets, etc., mounted a certain distance away from each other, a fastening screw passes all the way through the screw unit. The centers of the mounting holes in the components must be aligned with each other, but this is not ensured in many cases because of manufacturing tolerances, which means either that deformations will occur or that the parts must be remachined.

SUMMARY OF THE INVENTION

The task of the invention is to create a screw unit which continues to make it possible to make considerable adjustments to the distance between the components and to maintain the spacing between them and which in addition makes it possible to adjust the connecting element transversely to its longitudinal axis to bring in into the proper position for connecting. This task is accomplished by the support sleeve being mounted on a sliding support element which is held in place on a spacer, the support element being attached in such a way that the sleeve can be shifted in the direction perpendicular to the longitudinal axis of the screw unit. The spacer which holds the sliding support element of the screw unit in a fixed position can be provided with a relatively large through-hole, so that, if the mounting holes in the spacers are off-center, it is still possible to align the screw unit with the through-hole of the spacer closely holding the mounting element. Thus it is ensured that the only forces which the screw unit is obliged to absorb are forces which act in the direction of its longitudinal axis, whereas forces perpendicular to that as a result of deformations transverse to the longitudinal axis of the connecting element are prevented from occurring in the first place.

To create an area on the adjusting element where it can be held to shift the screw unit transversely to its longitudinal axis without interfering with the creation of the device which prevents the unit from being completely unscrewed, it is provided in accordance with an advantageous embodiment of the object of the invention that the area of the bore of the support sleeve opposite the internal thread has an inward-projecting step, the open diameter of which is approximately the same as the diameter of the central bore of the threaded pin. In its inside surface, the step has at least one axially oriented recess to allow the formation of the stop element which prevents the unit from being completely unscrewed. The stop element which prevents the unit from being completely unscrewed is advantageously formed by peening over certain areas of the external thread of the threaded pin. For safety's sake, it may be advantageous for the step to have two diametrically opposing axial recesses, which may serve to allow the insertion of a tool to peen over the thread on two opposing sides to form the device which prevents the unit from being completely unscrewed.

Although there are various ways in which the screw unit can be shifted transversely to its longitudinal axis, it is provided in accordance with a preferred embodiment of the invention that the support sleeve resting against the sliding support element has a threaded hole in the step, extending in the direction perpendicular to the longitudinal axis of the support sleeve; a fillister head screw, the head of which is held in a groove in the sliding support element in such a way that it can rotate but cannot move in the axial direction, engages in this hole. The sliding support element may be advantageously designed as a plate with an oblong hole in the middle area, the primary axis of the oblong hole extending in the sliding direction. The width of the oblong hole is approximately the same as the diameter of the central bore passing through the threaded pin, whereas the length of the oblong hole is greater than the central bore passing through the threaded pin by a distance equal to that by which the sleeve can be shifted. To hold the sliding support element in position on the component resting against it, the sliding support element is provided with at least one centering pin, which projects out from the side of the sliding support element opposite the side in contact with the support sleeve; the centering pin engages in a hole in the component resting against it. For the immovable support of the head of the fillister head screw, the sliding support element has a bridge part projecting upward next to the threaded bore of the support sleeve; the groove which holds the head of the fillister head screw is provided in this bridge part and extends transversely to the longitudinal axis of the threaded bore. So that the fillister head screw can be fitted into the sliding support element, the side of the element with the bridge part is provided with a slot extending outward from the oblong hole, the width of the slot being large enough to allow the shaft of the fillister head screw to pass through.

Finally, to define the shifting movement in the direction transverse to the longitudinal axis of the screw unit, the side of the sliding support element opposite the bridge part is provided with a guide slot, which is aligned with the longitudinal axis of the fillister head screw and holds the cylindrical head of a guide screw which is screwed into the outer end surface of the step of the sliding support element.

BRIEF DESCRIPTION OF THE DRAWING

The invention is explained in greater detail below on the basis of an exemplary embodiment, illustrated in the drawing.

DESCRIPTION OF THE PREFERRED EMBODIMENTS

Figure 1:
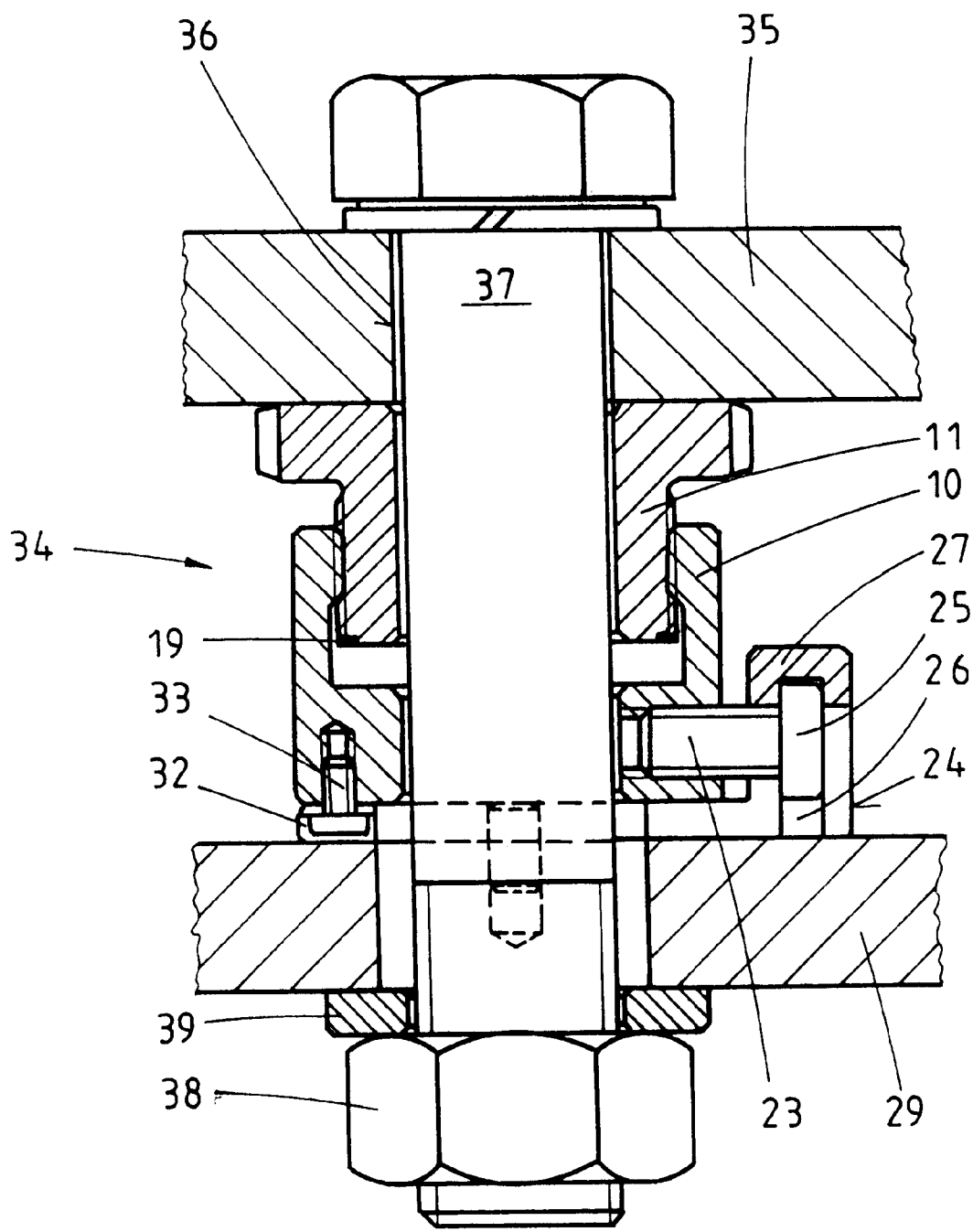
FIG. 1 shows the screw unit installed between two bracket parts, a mounting screw passing through both the unit and the two bracket parts.

The screw unit shown in the figures has a support sleeve 10 and a threaded pin 11. Support sleeve 10 and threaded pin 11 are connected to each other by threads, where threaded pin 11 has an external thread 12, which engages in a matching internal thread 13 in support sleeve 10. At its top end, threaded pin 11 has an adjusting collar 14, which projects in the radial direction over the outside diameter of support sleeve 10, and which is provided with adjusting surfaces 15, with which an adjusting tool can engage. Support sleeve 10 also has adjusting surfaces 16, which, in the illustrated exemplary embodiment, are formed by the hexagonal periphery of support sleeve 10. The adjusting surfaces could possibly be designed as simple flattened areas, possibly forming a polygon, but, as is the case here with adjusting collar 14 of threaded pin 11, they can also be designed as grooves extending in the axial direction and spaced a certain distance apart. A central bore 17, the purpose of which will be explained below, passes through threaded pin 11 in the axial direction.

On the end facing adjusting collar 14 of threaded pin 11, support sleeve 10 has a radially inward-projecting, ring-shaped collar 18, provided with internal thread 13; this collar has a stop for a stop element 19 provided on the free end of threaded pin 11. Stop element 19 could, for example, be formed by a locking ring, held in a groove at the bottom end of the shaft of threaded pin 11. In the case of the exemplary embodiment illustrated here, however, stop element 19 is formed by peening-over certain areas of the external thread on the pin. On the end of support sleeve 10 opposite ring-shaped collar 18, there is an inward-projecting step 20, the inside diameter of which is approximately the same as the diameter of central bore 17 passing through support sleeve 10. On the inside diameter of step 20, at least one a groove-like recess 21, extending in the axial direction, extends along the step, through which recess a tool for peening-over areas 19 of the lower thread portion of the lower thread portion of the external thread 12 on pin 11 can be introduced. Perpendicular to the longitudinal axis of support sleeve 10, a threaded hole 22 is provided in step 20, which serves to receive a fillister head screw 23.

In the area of step 20, support sleeve 10 is held from underneath by a plate-shaped sliding support element 24, upon which support sleeve 10 rests. Cylindrical head 25 of fillister head screw 23, which is screwed into threaded hole 22 in the support sleeve, has, for example, a hexagonal hole in it and engages in a groove 26 in sliding support element 24; head 25 is free to turn in this groove 26 but is held so that it cannot move in the axial direction. To create groove 26 in sliding support element 24, the sliding support element has a plate-shaped part, one side of which extends out beyond the contact surface with support sleeve 10; in this extended area, sliding support element 24 is provided with a projecting bridge part 27, in which groove 26, which is perpendicular to the longitudinal axis of threaded hole 22, is located. In the exemplary embodiment, the plate-shaped part is hexagonal. From the side of sliding support element 24 opposite the contact side with step 20, two opposing centering pins 28 project out from sliding support element 24 and engage in holes in a spacer 29, which holds sliding support element 24, as can be seen most easily in FIG. 1. Plate-shaped sliding support element 24 also has in its central area an oblong hole 30, the primary axis of which extends in the axial direction of fillister head screw 23. The width of this oblong hole is the same as central bore 17 passing through threaded pin 11. On the side with bridge part 27, sliding support element 24 has a slot 31, extending outward from oblong hole 30; this slot is wide enough to allow the shaft of fillister head screw 23 to be introduced from below into groove 26 of bridge part 27. To assemble the parts as shown in the figures, support sleeve 10 of screw unit 34 is first set down onto the contact side of sliding support element 24. Then fillister head screw 23 is screwed into threaded hole 22, while head 25 of this screw is in groove 26, to push the support sleeve perpendicular to the longitudinal axis of central bore 17 of the screw unit into the position shown in the figures. It should be obvious here that the length of oblong hole 30 is greater than central bore 17 of threaded pin 11 by a distance equal to that by which it is desired to shift support sleeve 10 with respect to sliding support element 24. To ensure that support sleeve 10 of the screw unit is guided smoothly as its position is shifted, sliding support element 24 has a T-shaped guide slot 32 on the side opposite bridge part 27; this slot is aligned with the longitudinal axis of fillister head screw 23. Guide slot 32 accepts the head of a guide screw 33, which is screwed from the outer end surface of step 20 into support sleeve 10. This guide screw 33 is self-locking, so that its head cannot turn while the position of support sleeve 10 is shifted.

To install screw unit 34, threaded pin 11 is first screwed into support sleeve 10. Then stop element 19 is installed in the manner previously described. Support sleeve 10 is now connected to sliding support element 24 by screwing fillister head screw 23 into threaded hole 22 in support sleeve 10. Head 25 of fillister head screw 23 remains in groove 26 of bridge part 27 of sliding support element 24. Guide screw 33 is also screwed from the bottom surface of step 20 of support sleeve 10 into the support sleeve until the head of guide screw 33 engages in T-shaped guide slot 32 in sliding support element 24. As a result, sliding support element 24 is attached to support sleeve 10 without the danger of being lost, and the direction in which support sleeve 10 is guided as it shifts position with respect to the sliding support element is guaranteed.

After screw unit 34 has been assembled in this way, it is connected to a spacer 29, in that centering pins 28 of sliding support element 24 are fitted into prepared holes in spacer 29. Then, the second part, i.e., bracket part 35, to be connected to spacer 29, is placed in position. First, by turning threaded pin 11 in the one direction or the other, the distance between bracket part 35 and spacer 29 can be adjusted to the exact value desired. Then, by turning fillister head screw 23, screw unit 34 can be pushed into a position so that central bore 17 is exactly aligned with through-hole 36 in bracket part 35, or the assembly to be adjusted can be held permanently in the axial direction. It is obvious that the bore in spacer 29 should be somewhat larger than central bore 17 in threaded pin 11, so that adjustment can be made transversely to the axial direction of central bore 17. Finally, after screw unit 34 has been properly adjusted, spacer 29 is connected to bracket part 35 by a cap screw 37, which can tighten spacer 29 against bracket part 35 by means of a nut 38 and an intermediate washer 39.

Figure 2:
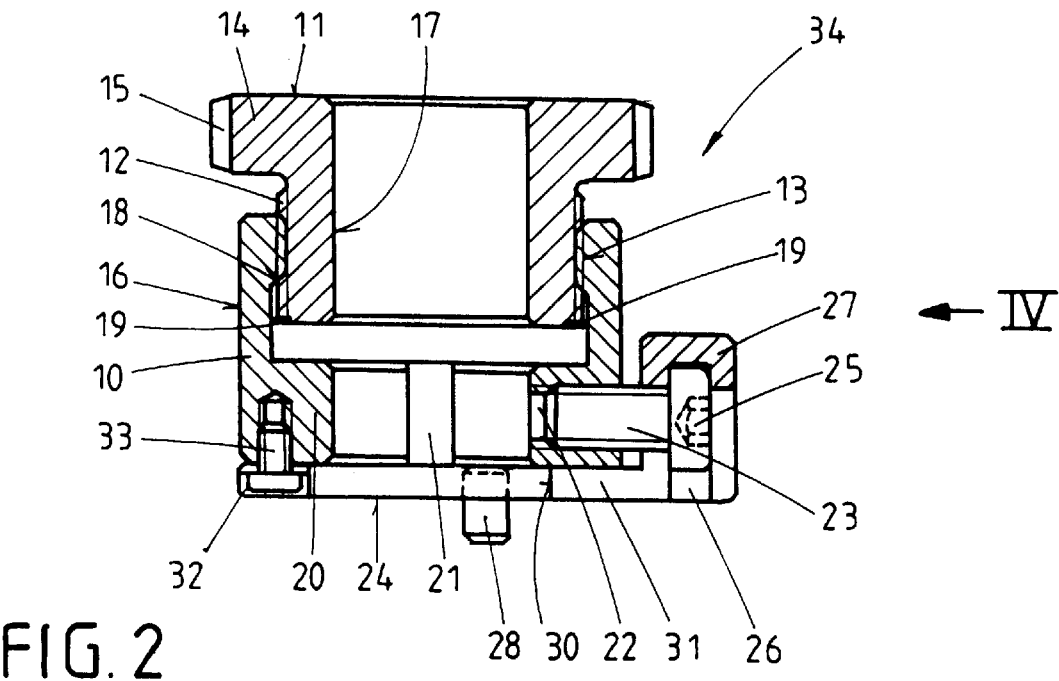
FIG. 2 shows the screw unit of FIG. 1 in a similar vertical cross section but without the bracket parts and the mounting screw.
Figure 3:
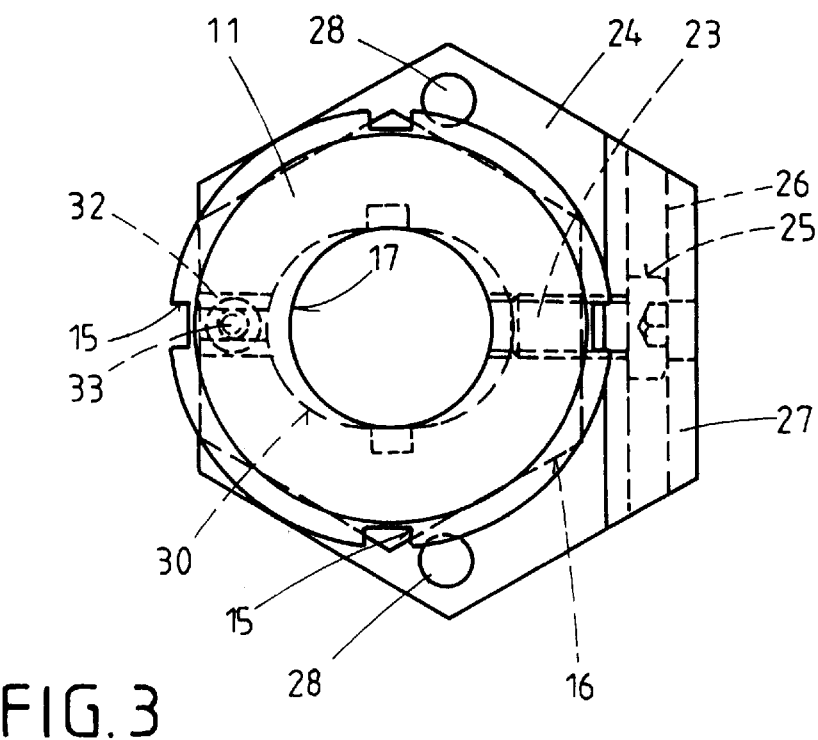
FIG. 3 shows a plan view of the same screw unit as that shown in FIG. 2.
Figure 4:
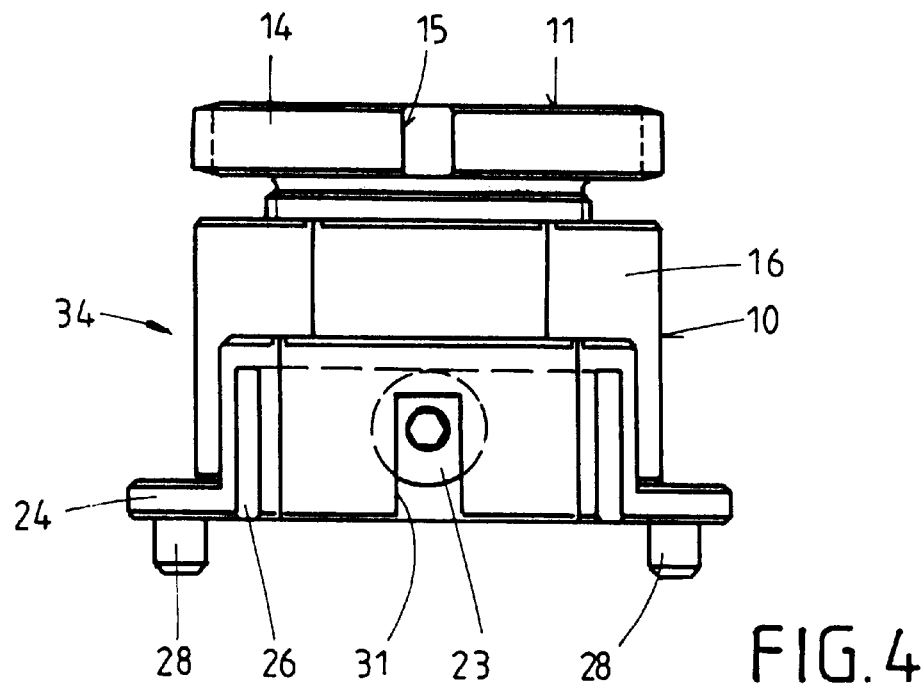
FIG. 4 shows a view of the screw unit of FIG. 2 in the direction of arrow IV in FIG. 2.
Figure 5:
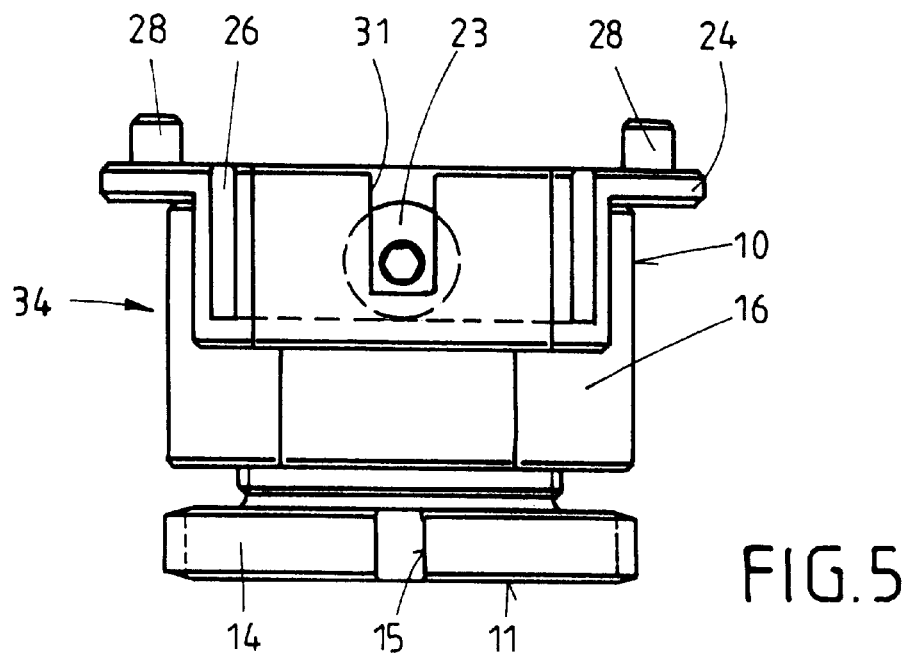
FIG. 5 shows a view of the screw unit of FIG. 4 after it has been rotated 180° for installation.

Whereas the installed position of screw unit 34 shown in FIGS. 1–3 corresponds to the installation position shown in FIG. 4 and is certainly the one which will be used in most cases, screw unit 34 could also be installed in the position shown in FIG. 5. In the latter case, centering pins 28 would engage in holes in bracket part 35, whereas spacer 29 then no longer needs to have any holes for centering pins 28. Finally, through-hole 36 with the same diameter as central bore 17, located in bracket part 35 in FIG. 1, could be provided instead in spacer 29, as long as the hole provided in bracket part 35 is made large enough.

As already mentioned, the embodiment of the object of the invention illustrated and described here represents only an example, to which the invention is in no way limited. On the contrary, additional embodiments and designs of the object of the invention are also conceivable. In addition, all of the features shown in the drawings and described in the specification are essential to the invention, even if they are not explicitly cited in the claims.

I claim:

1. Screw unit for the adjustable and lockable spanning of distances between structural components, brackets, and for the adjustment of assemblies comprised of:

a threaded pin (11), which has adjusting surfaces (15) and a central bore (17) passing through it;

a support sleeve (10) with an internal thread (13) and adjusting surfaces (16), the support sleeve (10) having an end with an inward-projecting, ring-shaped collar (18), wherein the internal thread (13) is provided at the ring-shaped collar (18), the threaded pin (11) being configured to be screwed into the internal thread (13) until being flush with the ring-shaped collar (18);

a stop element (19) provided at the free end of the threaded pin (11) configured to prevent the threaded pin (11) from being unscrewed completely;

a sliding support element (24), which is held in place on a spacer (29);

the support sleeve (10) attached to the sliding support element (24) in such a way that the support sleeve (10) can be shifted in the direction perpendicular to the longitudinal axis of the screw unit.

2. Screw unit according to claim 1, wherein the bore area of the support sleeve (10) opposite the internal thread (13) has an inward-projecting step (20), the open diameter of which is approximately the same as the central bore (17) of the threaded pin (11), where the inside surface of the step (20) is provided with at least one recess (21) extending in the axial direction to allow the formation of the stop element (19) which prevents the pin from being completely unscrewed.

3. Screw unit according to claim 1, wherein the stop element (19) which prevents the pin from being completely unscrewed is formed by peening over certain areas of the external thread of the threaded pin (11).

4. Screw unit according to one claim 1, wherein the support sleeve (10) resting against the sliding support element (24) has a threaded hole (22) in the step (20) extending in a direction perpendicular to the longitudinal axis of the support sleeve (10), into which hole a fillister head screw (23) is inserted, the head (25) of which is held in a groove (26) of the sliding support element (24) so that it can be rotated but cannot move in the axial direction.

5. Screw unit according to claim 4, wherein the sliding support element (24) is designed as a plate and has in its central area an oblong hole (30), the primary axis of which extends in the sliding direction, the width of the hole being the same as the central bore (17) of the threaded pin (11), whereas its length is greater than the central bore of the threaded pin (11) by a distance equal to that by which the sleeve can be shifted.

6. Screw unit according to claim 5, wherein the sliding support element (24) is provided with at least one centering pin (28), which projects out from the side of the sliding support element (24) opposite the side in contact with the support sleeve (10).

7. Screw unit according to claim 5, wherein the sliding support element (24) has a bridge part (27) projecting upward next to the threaded hole (22) of the support sleeve (10), in which bridge part the groove (26) which accepts the head (25) of the fillister head screw (23) is provided, the groove being perpendicular to the longitudinal axis of the threaded hole (22).

8. Screw unit according to claim 7, wherein the sliding support element (24) has a slot (31), which is on the same side as the bridge part (27) and which extends outward from the oblong hole (30), this slot being wide enough to allow the shaft of the fillister head screw (23) to pass through.

9. Screw unit according to claim 7, wherein, on the side opposite the bridge part (27), the sliding support element (24) has a guide slot (32), which is aligned with the longitudinal axis of the fillister head screw (23) and holds the cylindrical head of a guide screw (33), which is screwed into the outer end surface of the step (20) of the support sleeve (10).

* * * * *